U. L. HENDRICKS.
TOBACCO STRIPPING MACHINE.
APPLICATION FILED APR. 21, 1916.

1,365,992.

Patented Jan. 18, 1921.
3 SHEETS—SHEET 1.

Witness
A. G. Hague.

Inventor
Udell L. Hendricks
by Orwig & Bair attys

U. L. HENDRICKS.
TOBACCO STRIPPING MACHINE.
APPLICATION FILED APR. 21, 1916.
1,365,992.
Patented Jan. 18, 1921.
3 SHEETS—SHEET 2.
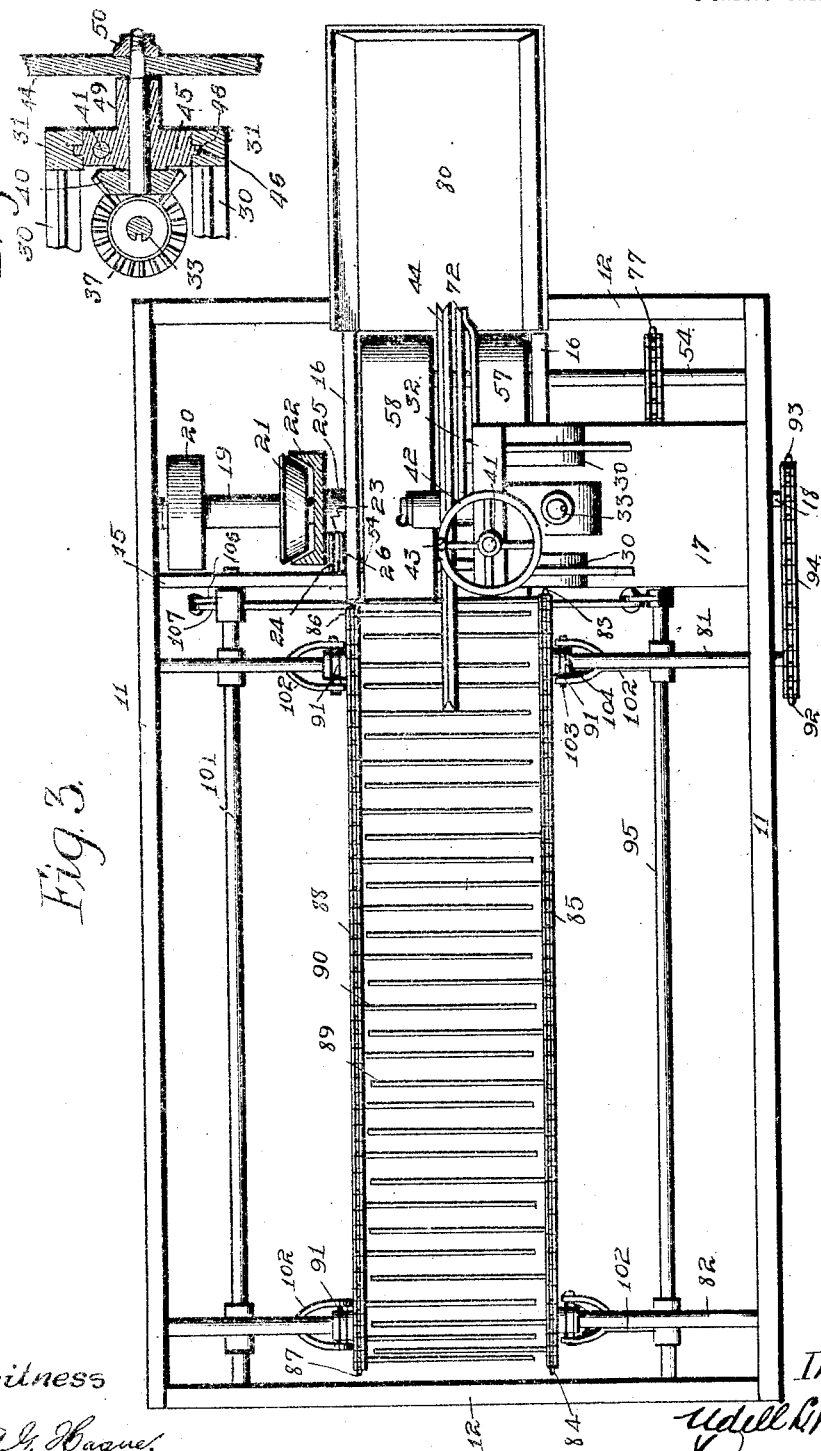

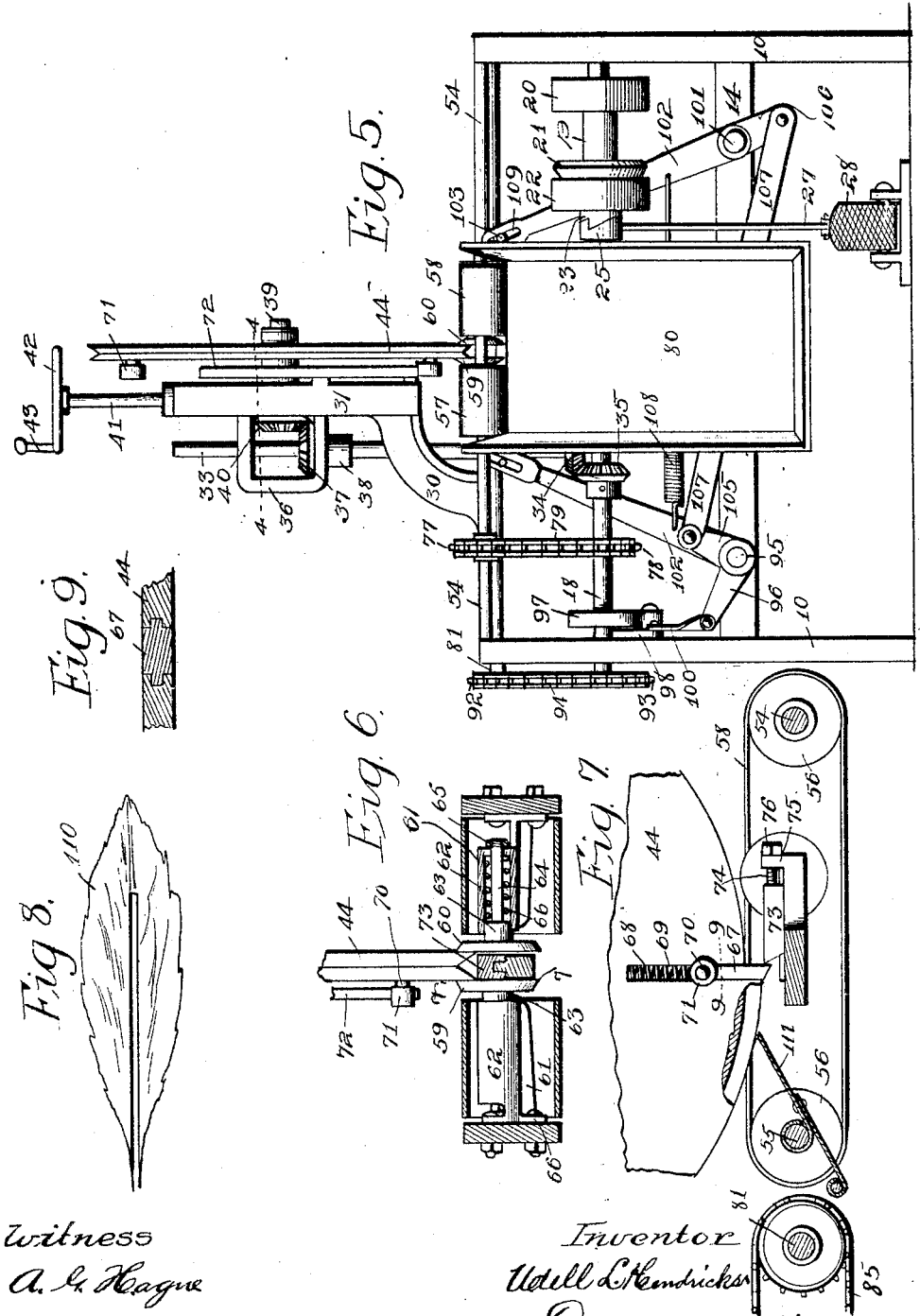

UNITED STATES PATENT OFFICE.

UDELL L. HENDRICKS, OF PELLA, IOWA.

TOBACCO-STRIPPING MACHINE.

1,365,992.  Specification of Letters Patent.  Patented Jan. 18, 1921.

Application filed April 21, 1916. Serial No. 92,636.

*To all whom it may concern:*

Be it known that I, UDELL L. HENDRICKS, a citizen of the United States, and resident of Pella, in the county of Marion and State of Iowa, have invented a certain new and useful Tobacco-Stripping Machine, of which the following is a specification.

My invention relates to machines for stripping the stems from tobacco leaves and arranging the stripped leaves in suitable layers or books.

The object of my invention is to provide a machine in which the leaves may be fed to a suitable cutting device which will remove the stiffer and thicker portion of the stem, leaving as much as desired of the stem at the upper end of the leaf by the use of knives of different sizes.

A further object is to provide such a machine in which the leaves thus stripped are carried to a certain position and then dropped or laid in layers or piles.

Still a further object is to provide a machine having parts which can be readily and easily adjusted or changed for stripping the stems from leaves of different sizes of tobacco.

My invention consists in the construction, arrangement and combination of the various parts of the device, whereby the objects contemplated are attained, as hereinafter more fully set forth, pointed out in my claims, and illustrated in the accompanying drawings, in which:

Fig. 3 shows a top or plan view of the machine.

Fig. 4 shows a detail, sectional view taken on the line 4—4 of Fig. 5.

Fig. 5 shows a front elevation of the machine.

Fig. 6 shows a detail, sectional view of the cutting mechanism and parts connected therewith.

Fig. 7 shows a detail, sectional view of parts of the cutting mechanism, taken on the line 7—7 of Fig. 6.

Fig. 8 shows a plan view of a leaf of tobacco after the stem has been stripped therefrom, according to the style of knife used and Fig. 9 shows a horizontal sectional view, taken on the line 9—9 of Fig. 7.

Figures 1, 2:
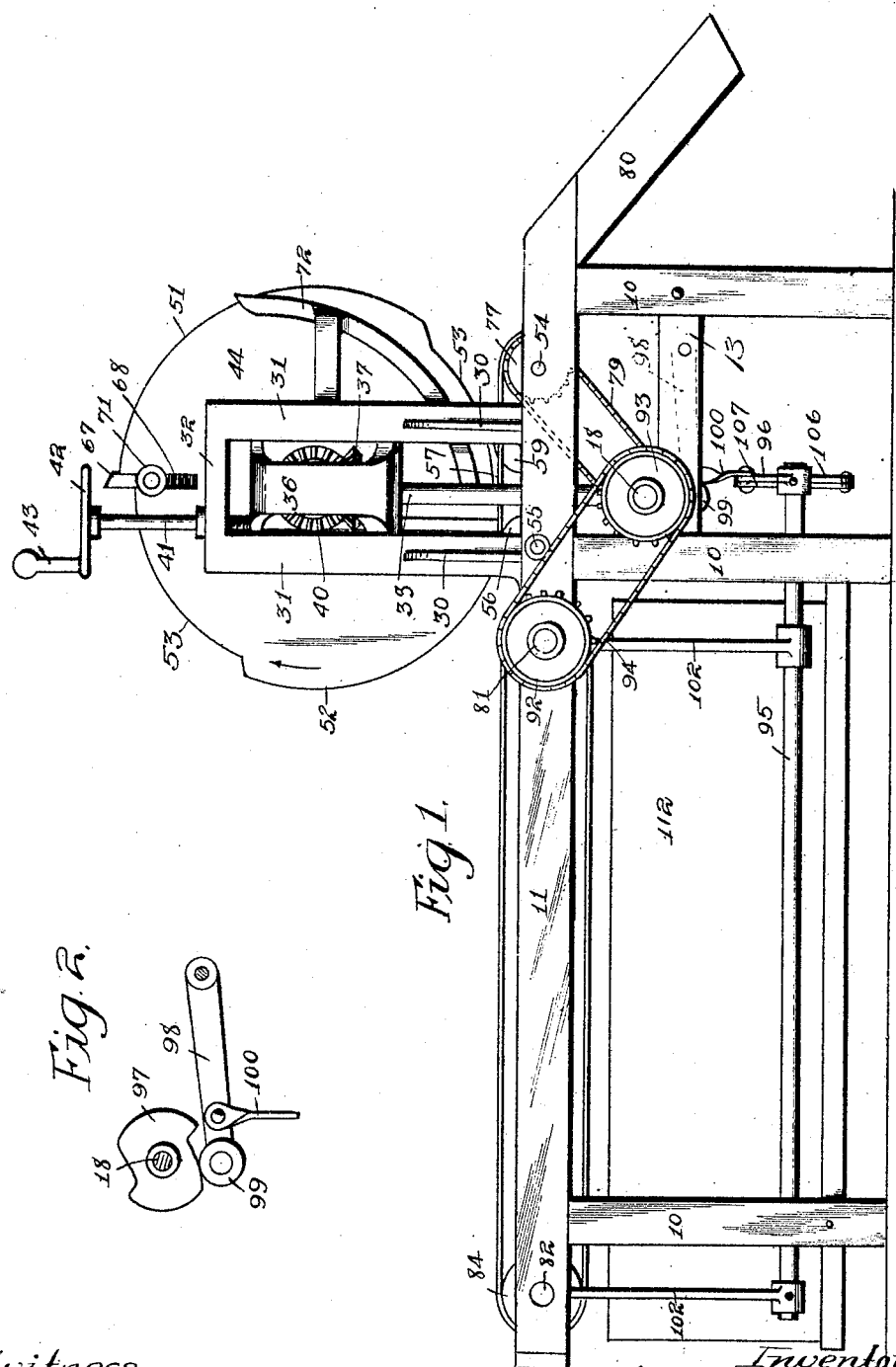
Figure 1 shows a side elevation of a tobacco stemming machine embodying my invention.
Fig. 2 shows a detail view partly in section, of one of the operating cams and parts connected therewith.

In the accompanying drawings I have used the reference numeral 10 to indicate upright frame members, upon the upper ends of which are supported the longitudinally arranged spaced side frame members 11. The upper ends of the members 11 are connected by transverse frame members 12. Suitable braces 13 and 14 may be provided.

A transverse frame member 15 connects the members 11 and is spaced rearwardly from the front transverse frame member 12. Spaced parallel longitudinal frame members 16 connect the member 15 with the forward frame member 12. Supported upon the frame members 15 and 16 and the left hand frame member 11, is a platform 17.

Suitably mounted on the frame near the forward part thereof is a transverse power shaft 18 on which is loosely mounted the sleeve 19, on one end of which is a belt wheel 20 or other equivalent whereby power may be applied for rotating the shaft 18. On the opposite end of the sleeve 19 is a beveled clutch member 21. Slidably but nonrotatably mounted on the shaft 18 adjacent to the clutch member 21, is a coacting clutch member 22. Adjacent to the clutch member 22 on the side thereof opposite the clutch member 21, is a collar 23 having beveled teeth on its side opposite the clutch member 22. The clutch member 22 may rotate freely with relation to the collar 23. The collar 23 is slidably mounted and is arranged to permit rotation of the shaft 18, and is held against rotation by an arm 24 secured to the frame of the machine and said collar 23.

Rotatably mounted on the shaft 18 adjacent to the collar 23 is a collar 25 which abuts against the frame on one side and has on its side adjacent to the collar 23 beveled teeth.

Fixed to the collar 25 is a rearwardly extending arm 26, pivoted to the rearward end of which is a link 27 extending downwardly and forwardly in the machine and pivoted to a foot pedal 28. It will be seen that by pressing the foot pedal 28 downwardly the arm 26 will be moved for causing the beveled teeth of the collars 25 and 23 to coact for moving the collar 23 longitudinally on the shaft 18 against the clutch member 22, thereby moving the clutch member 22 into frictional engagement with the clutch member 21, whereupon when rotation is imparted to the pulley 20 and the sleeve 19 and the clutch member 21, said clutch member 21 will impart rotation to the clutch member 22 and the shaft 18.

Suitably mounted on the platform and frame members are upwardly extending bracket arms 30 arranged parallel with each other and spaced from each other, supporting at their upper ends the upright members 31 which are connected at their upper ends by a longitudinally arranged member 32. Suitably mounted on the frame near the members 31, is an upright shaft 33 on the lower end of which is a beveled gear 34 in mesh with the beveled gear 35 on the shaft 18. Slidably mounted on the members 31 is a laterally opening U-shaped bracket 36, the free ends of which are slidably mounted on the members 31. The arms of the bracket 36 form bearings for the shaft 33.

Rotatably and slidably mounted on the shaft 33 is a beveled gear 37 having a hub 38 which extends downwardly through the bearing formed by the lower arm of the bracket 36, as shown in Fig. 5. Suitably mounted between the ends of the arms of the bracket 36 is a short transversely arranged shaft 39, having on one end a beveled gear 40 between the arms of said bracket 36, in mesh with the beveled gear 37.

It will be noted that the ends of the arms of the bracket 36 are connected by a web 45 which has tongues 46 slidably received in grooves 48 in the members 31.

Rotatably but nonslidably mounted in the frame member 32 is an upright rod 41, the lower end of which is screw-threaded and is mounted in a screw-threaded opening in the web 45. On the upper end of the rod 41 is a hand wheel 42 on which is a handle 43. It will be seen that by rotating the rod 41 by means of the hand wheel 42 the bracket 36 may be moved slidably upwardly or downwardly on the frame members 31, thereby raising or lowering the short shaft 39 and the gears 37 and 40.

Removably mounted on the short shaft 39 is a cutting disk or wheel 44. As shown in Fig. 4 the disk 44 is keyed on the shaft 39 and is spaced from the web 45 by means of the sleeve 49. The end of the shaft 39 is screw-threaded to receive a nut 50, whereby the cutting disk or blade is locked on the shaft.

The disk 44 may be made in a variety of sizes for stripping the stems from tobacco leaves of different lengths. As shown the disk 44 is provided with two opposite cutting edges 51 and 52, between which are the opposite recesses or blanks 53. The cutting portions 51 and 52 are formed V-shaped in cross section, as clearly shown in Figs. 5 and 6, so as to cut the leaves on two spaced lines. The edges of the cutting portions are arranged to coact with rotary disks 59 and 60, shown in Fig. 6. In said figure are shown spaced opposite brackets 61, on which are mounted transversely arranged, alined spaced sleeve 62, arranged below the disk 44 and on opposite sides thereof. Slidably mounted in the adjacent ends of the sleeves 62 are the hubs 63 of the cutting disks 60. Extending from the hubs 63 through the sleeves 62 are shafts 64 which are journaled in the outer ends of the sleeves 62. The outer ends of the shafts 64 are screw-threaded to receive nuts 65 outside the sleeves 62, for limiting the movement of the disks 60 and 59 toward each other.

Mounted within each sleeve 62 between the hub 63 and the opposite end of the sleeve 62 is a coil spring 66 which yieldingly holds the disk 59 or 60, as the case may be, at the limit of its movement toward the center of the machine. The positions of the cutting disks 59 and 60 may be regulated by means of the nuts 65. The cutting disks 59 and 60 are arranged to slightly overlap the cutting edges of the cutting portions of the disk 44 adjacent to the outer surfaces of said disk 44, as shown in Fig. 6.

Slidably mounted in the disk 44 radially thereof, are cutting knives 67 which are respectively arranged at the points where the cutting edges 51 and 52 terminate. The cutting knives 67 are yieldingly held at the forward limit of their movement by means of springs 68 received in suitable slots 69 in the disk 44.

On each cutting knife 67 is a laterally extending spindle 70 on which is a roller 71. Suitably mounted on the frame members 31 is a cam faced guide device 72, so arranged as to be engaged by the rollers 71 during the rotation of the disk 44, for drawing the cutting knives 67 radially inwardly until their outer cutting edges stand within the circle of the disk 44. The cam faced guide 72 is so shaped that it releases the rollers 71 when the cutting knives 67 are in downwardly extending vertical position, whereupon the spring 68 will force the cutting knives 67 downwardly.

A cutting knife 73 is arranged to slide horizontally in the machine below the disk 44 and is provided with a screw-threaded opening to receive a screw 74 which is rotatably but nonslidably mounted in a supporting bracket 75. By rotating the head 76 of the screw 74 the knife 73 may be adjusted in the machine so that material placed between the knives 67 and 73 will be cut with a shearing motion.

Mounted in the frame members of the machine are spaced transverse shafts 54 and 55, on which are mounted suitable rollers 56. The rollers 56 are arranged in pairs spaced apart transversely in the machine. The rollers on the shaft 54 are arranged in alinement horizontally of the machine with the rollers on the shaft 55. Traveling on the rollers just described are two endless aprons 57 and 58, located on opposite sides of the vertical plane in which the cutting disk 44 stands, as shown in Fig. 5.

On the shaft 54 is a sprocket 77 in line with the sprocket 78 on the shaft 18. A chain 79 travels on the sprockets 77 and 78. At the forward end of the machine is a receptacle 80 to hold the stock of tobacco leaves ready to be stemmed.

Mounted on the frame members 11 rearwardly of the endless aprons 57 and 58, are spaced parallel horizontal transverse shafts 81 and 82. The shaft 81 is mounted just rearwardly of the delivery ends of said aprons and the shaft 82 is mounted near the rear end of the machine.

On the shaft 81 is a sprocket 83 in line with the sprocket 84 on the shaft 82. A chain 85 travels upon said sprockets.

On the shaft 81 is a sprocket 86 in line with the sprocket 87 on the shaft 82. A chain 88 travels on the sprockets 86 and 87. On the chain 85 are a plurality of spaced wires 89, extending toward and almost to the chain 88, and on the chain 88 are similar wires 90 extending toward and almost to the chain 85. The wires 89 and 90 with the chains and parts for operating them form an endless carrier for the tobacco leaves.

The sprockets 83, 84, 86 and 87 have hubs 91 and are slidably but nonrotatably mounted on the shafts 81 and 82. On the shaft 81 is a sprocket 92 in line with the sprocket 93 on the shaft 18. A chain 94 travels on the sprockets 92 and 93, whereby rotation may be imparted to the shaft 81.

Mounted in the machine below the shafts 81 and 82 is a longitudinally arranged shaft 95, having near its forward end a laterally extending arm 96 extending upwardly and toward the side of the machine.

Mounted on the shaft 18 is a cam 97. Pivoted on the frame of the machine is an arm 98 on which is a roller 99 in engagement with the cam 97. A link 100 is pivoted to the arm 97 and to the arm 96.

The shaft 95 is located near one side of the machine and a similar shaft 101 is located near the other side of the machine parallel with the shaft 95 and preferably on the same level therewith. On the shaft 95 are a pair of arms 102 extending upwardly and toward the adjacent hubs 91, as shown in Figs. 3 and 5. The upper ends of the arms 102 are bifurcated and the bifurcated arms have inwardly extending, opposite pins 103 which travel in grooves 104 in the hubs 91.

On the shaft 101 are similar arms 102 having their upper ends bifurcated and operatively connected with the hubs 91 on the opposite side of the machine in the manner just described.

For connecting the shafts 95 and 101 so that their operation will be simultaneous, there is provided on the shaft 95 an upwardly and inwardly extending arm 105, and on the shaft 101 the downwardly and outwardly extending arm 106. The ends of the arms 105 and 106 are pivoted to a link 107 extending across the machine between said arms.

The arms 102 on opposite sides of the machine are connected by springs 108 which serve to hold the hubs 91 at the limit of their movement toward each other on the shafts 81 and 82. The bifurcated upper ends of the arms 102 are provided with slots 109 to permit proper play of the pins 103.

In Fig. 8 I have shown a tobacco leaf 110 with part of the stem removed.

I will now explain the practical operation of my improved tobacco stemming machine. By way of preface it may be said that tobacco leaves are graded in substantially standard lengths. For removing the stems from leaves of different lengths I use different sizes of cutting disks 44, the different disks being adjusted vertically by means of the slidable bracket 36 and the parts connected therewith.

It may also be explained that tobacco leaves are handled damp, and that they are delicate and are inclined to curl up and become folded over on themselves when handled. It is, therefore, desirable and is the common practice when the stemming is done by hand, to handle the leaves very carefully and lay them after they have been stemmed, in piles or books, for storage and further treatment and handling in the course of manufacture into cigars. It is necessary to remove the stems which are thick and hard and comparatively heavy.

In stemming tobacco leaves with my improved machine the operator lays the leaf on the endless carriers 57 and 58 with the butt toward the cutting disk and with the stem of the leaf arranged longitudinally of the machine between the carriers 57 and 58 and in line with the coacting cutting edges of the disk 44 and the disks 59 and 60. The leaf is so fed that it starts between the cutting edges at the first part of one of the cutting portions 51 or 52. The cutting disk rotates in the direction indicated by the arrow in Fig. 1.

The lengths of the cutting portions 51 and 52 of the cutting disk are such that the leaf is cut on each side of the stem, as shown in Fig. 8, for the proper length. It will be seen that by using a disk 44 having cutting portions 51 and 52 of certain lengths, an entire stem may be cut from the leaf and the leaf thus cut into two parts. The stem at the upper portion of the leaf is usually saved for the reason that it is desired not to cut the leaf entirely in two, because especially in the case of tobacco used for filler the cigar maker can handle the leaves more rapidly if the two halves are left fastened together. It will also be obvious that by leaving the upper flexible end of the stem a saving of material is accomplished.

The cutting portions 51 and 52 are of such length that at the proper point in a leaf of any standard size, the cutting edge travels until one of the cutting knives 67 stands directly above the leaf, at which time the roller 71 is released by a cam 72 and the spring 68 forces the cutting knife 67 downwardly adjacent to the cutting edge of the cutting knife 73, and cuts the stem in two.

As the upper stretches of the carriers 57 and 58 travel forwardly the stems drop beneath a guide plate 111 arranged between said carriers, and are dropped downwardly. The remaining portion of the leaf is then in the condition shown in Fig. 8 with the larger part of the stem removed, and travels to the rear ends of the carriers 57 and 58 and is discharged upon the wires 89 and 90. The wires 89 and 90 carry the leaves rearwardly in the machine until the cam 97 reaches a certain point in its rotation, whereupon the arms 102 are operated for moving their upper ends laterally away from the center of the machine and drawing the wires 89 and 90 on the opposite chains 85 and 88 apart, with a quick movement allowing the tobacco leaf to drop gently into a suitable receptacle 112. It will thus be seen that the leaves will be arranged in piles.

It will be noted that by changing the size of the disk 44 and raising or lowering the shaft 39 on which said disk is mounted, by the operation of the shaft 41 and the parts connected therewith, the length of stem which is removed can be varied as desired and a single machine adapted for use with tobacco leaves of different lengths.

It will be noted that the cutting disks 59 and 60 are yieldingly held adjacent to the cutting edges of the cutting disk 44 so that a shearing cut is obtained at all times, and may be readily adjusted for disks 44 of different thicknesses. The rotation of the disk 44 causes the disks 59 and 60 to rotate. In this connection it may be mentioned that the parts 53 do not touch the disks 59 and 60.

The parts are of simple construction, and as shown in the drawings and hereinbefore described, are so put together that they may be easily and readily taken apart for repairing or storing the machine.

In Fig. 5, I have omitted the showing of the front frame member 12 in order to more clearly show the shafts and other parts. The machine is of comparatively simple operation, and will strip the stems from the tobacco leaves much more rapidly and accurately than can be done by hand. The use of the machine also greatly reduces the manual handling of the tobacco leaves.

Changes may be made in the construction and arrangement of the various parts of my improved machine without departing from the essential features and purposes thereof, and it is my intention to cover by my present application any such changes which may be included within the scope of my claims.

I claim as my invention:

1. In a machine of the class described, a frame, means thereon for advancing tobacco leaves, means for cutting along said leaves on opposite sides of their stems, means carried by said last means for making a transverse cut through a stem.

2. In a machine of the class described, a pair of horizontal, spaced, endless carriers, a cutting disk arranged above and between said carriers, having a grooved periphery with two cutting edges for making longitudinal cuts in leaves advanced on said carriers, and means carried by said disks for making a transverse cut in said leaves at certain points in the rotation of said disk.

3. In a machine of the class described, a frame, a cutting device arranged on said frame, having two spaced cutting edges, coacting cutting devices on said frame, and coacting means on said device and on said frame for making a transverse cut at certain times in the movement of said cutting device.

4. In a machine of the class described, a frame, a pair of endless carriers mounted thereon, a cutting device arranged above and between said carriers, having two spaced cutting edges, coacting cutting devices on said frame between said carriers, coacting means on said device and on said frame for making a transverse cut at certain times in the rotation of said device, and means for adjustably supporting said device for rotation, said last means being capable of vertical adjustment.

5. In a machine of the class described, a frame, a pair of endless carriers mounted thereon, a cutting disk arranged above and between said carriers, having a grooved periphery with two spaced cutting edges, coacting cutting devices on said frame between said carriers, coacting means on said disk and on said frame for making a transverse cut at certain times in the rotation of said disk, means for adjustably supporting said disk for rotation, said last means being capable of vertical adjustment, and means for imparting rotation to said disk in any position of said last described means.

6. In a machine of the class described, a frame, a cutting device arranged on said frame, having two spaced cutting edges, and coacting cutting devices on said frame, said device having a portion of its cutting edges recessed to remain spaced from said cutting devices on the frame at all times in the movement of said devices.

7. In a machine of the class described, a frame, a cutting disk arranged on said frame for rotation, having at its periphery a grooved portion with two spaced cutting edges, coacting cutting devices on said frame, said disk having a portion of its periphery arranged to remain spaced from said cutting devices on the frame at all times, and coacting means on said disk and said frame for making a transverse cut between said spaced cutting edges at a certain time in the rotation of said disk.

8. In a device of the class described, a frame, means for mounting a cutting member on a frame, said cutting member having at one edge a cutting edge and a blank portion, and a device on the frame for coacting with said cutting edge and arranged to be at all times spaced from said blank portion of the cutting member edge.

9. In a device of the class described, a frame, a slidable support thereon, means for mounting a cutting member on said support for rotation, a cutting member having at its periphery a cutting edge and a blank portion, a device on the frame, for coacting with said cutting edge and arranged to be at all times spaced from said blank portion of the cutting member edge, and means for slidably adjusting said support.

10. In a machine of the class described, means for cutting the stem from tobacco leaves, means for receiving and carrying said leaves after they have been acted upon by said first means, said last means comprising spaced endless flexible members each having wires extended toward the opposite flexible member, and means for moving said flexible members toward and from each other.

11. In a device of the class described, a frame, means for advancing tobacco leaves thereon, a shaft, a rotary cutting member detachably mounted on said shaft, adapted to cut a leaf on opposite sides of the stem thereof, and means carried by said rotary cutting member for making a transverse cut across the stem of a leaf.

12. In a device of the class described, a frame, means for advancing tobacco leaves thereon, a shaft, a rotary cutting member detachably mounted on said shaft, adapted to cut a leaf on opposite sides of the stem thereof, means carried by said rotary cutting member for making a transverse cut across the stem of a leaf, and means for vertically adjusting said shaft.

13. In a machine of the class described, means for cutting the stem from tobacco leaves, means for receiving and carrying said leaves after they have been acted upon by said first means, said last means comprising spaced, endless, flexible members each having wires extended toward the opposite flexible member, and means for automatically moving said flexible members toward and from each other.

Des Moines, Iowa, April 7, 1916.

UDELL L. HENDRICKS.